July 31, 1956        C. A. LANE        2,757,008
3-JAW UNIVERSAL, SQUARED SURFACE ADAPTER JAWS
Filed March 19, 1953        2 Sheets-Sheet 1
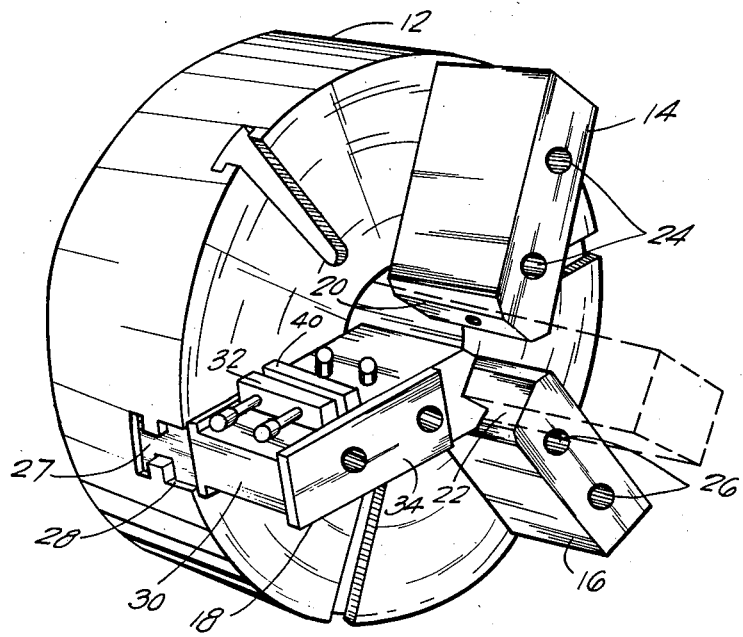
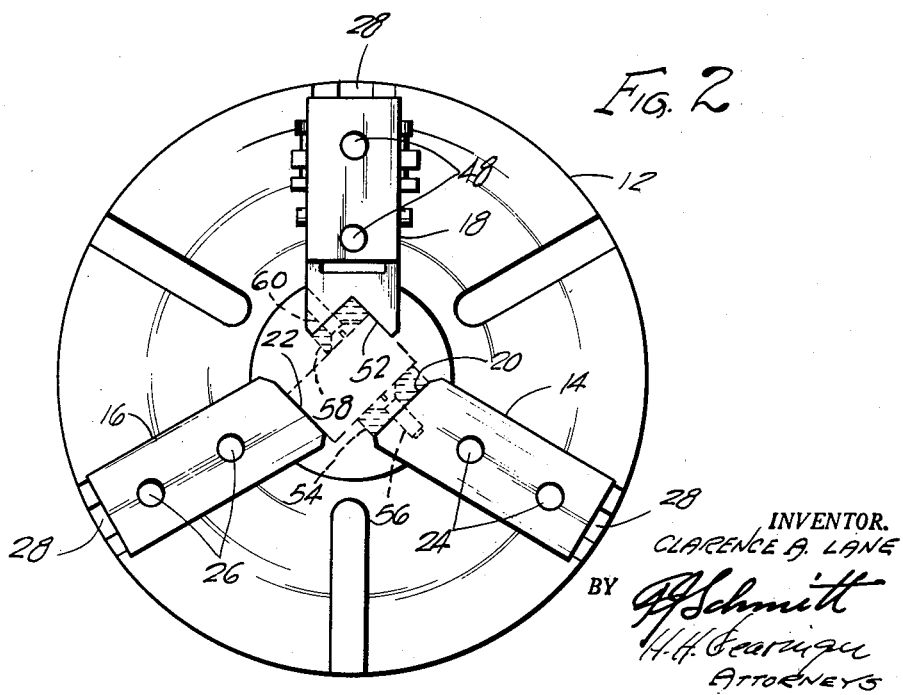
INVENTOR.
CLARENCE A. LANE
BY
ATTORNEYS

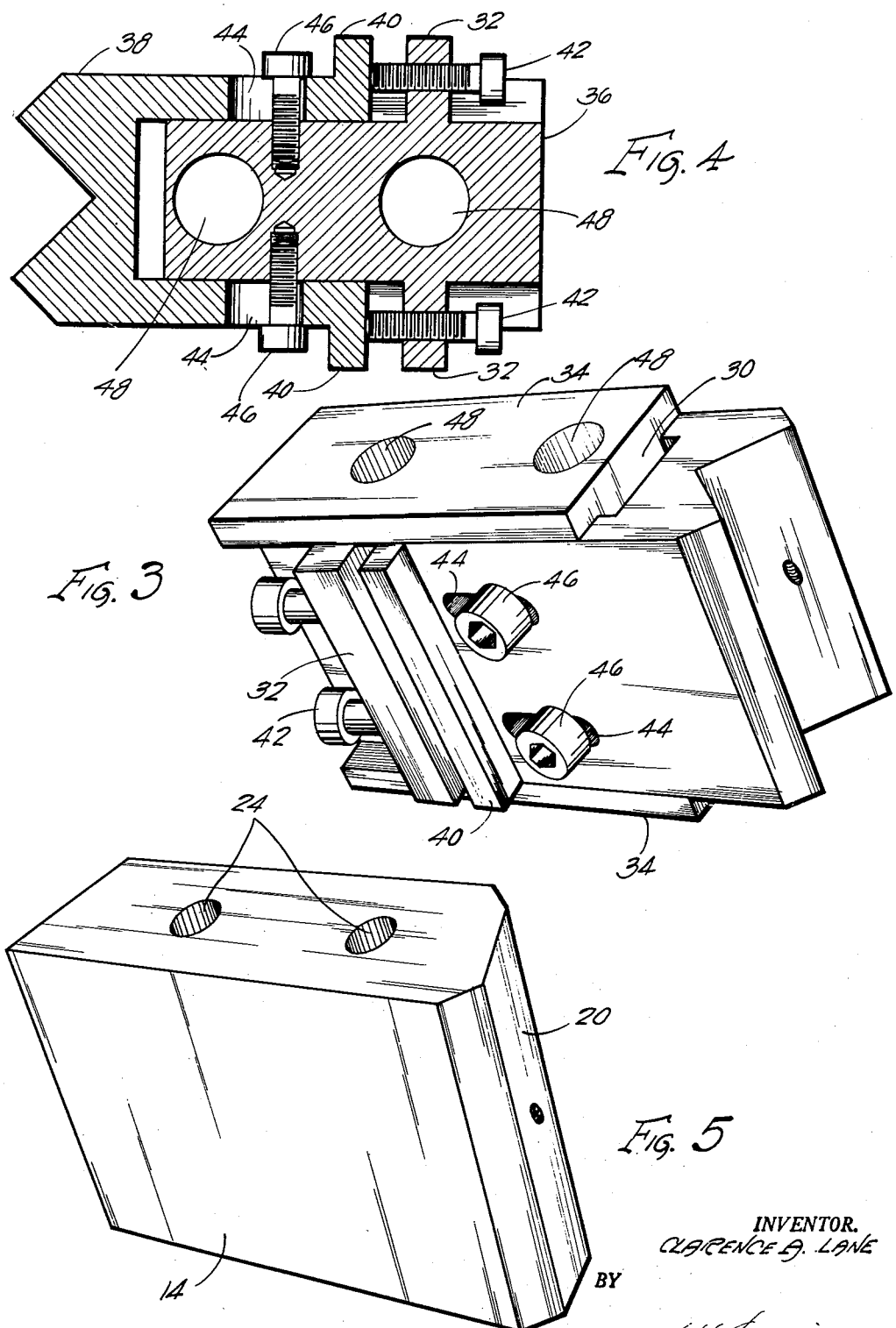

2,757,008

3-JAW UNIVERSAL, SQUARED SURFACE ADAPTER JAWS

Clarence A. Lane, Aldan, Pa.

Application March 19, 1953, Serial No. 343,537

1 Claim. (Cl. 279—110)

(Granted under Title 35, U. S. Code (1952), sec. 266)

The invention described herein may be manufactured by or for the Government of the United States of America for governmental purposes without the payment of any royalties thereon or therefor.

This invention relates to a work holder for use with drill presses, planers, grinders, lathes and the like and particularly relates to work holders which are adapted to hold in clamped position work pieces of various sizes and shapes.

Heretofore, when a work holding chuck adapted to hold work pieces of round or hexagonal cross-sectional shape was installed on a machine, if it was, thereafter, desired to use the machine to operate on work of a square or oblong shape, it was necessary to replace the one type of chuck with another type suited to the work. This involved not only a waste of time and effort during the removal of the first chuck and the substitution of the second, but also required the stocking of the various kinds of chucks suited for the various types of work with the consequent excessive cost and wastage of storage space.

It is one object of this invention to provide a device wherein a single type of work holder may be used for work of various sizes and shapes.

Another object of this invention is to provide a work holder device wherein the waste of time and effort due to change-over of the various parts to adapt the device to different work is eliminated.

Another object of this invention is to provide a work holding device adapted for various types of work which is relatively inexpensive to manufacture, requires few parts, and is easy and economical to use.

Other objects and many of the attendant advantages of this invention will be readily appreciated as the same becomes better understood by reference to the following detailed description when considered in connection with the accompanying drawings wherein:

Figure 1 is a perspective view of an embodiment of the invention.

Figure 2 is a top plan view of the invention shown in Figure 1 and showing the device adapted for oblong work.

Figure 3 is a perspective view of the fine adjustment jaw.

Figure 4 is a cross-sectional view of the jaw shown in Figure 3.

Figure 5 is a perspective view of one of the other jaws.

Referring now in greater detail to the drawings wherein similar reference characters refer to similar parts there is shown a standard 3-jaw universal chuck 12 which is of ordinary design and forms no part of this invention in itself.

Mounted on the chuck 12 for radial clamping movement toward and away from the central portion thereof are a plurality of jaws designated 14, 16 and 18, respectively. The radial clamping movement of the jaws is performed in the manner common to the type of universal chuck illustrated and it is, therefore, not considered necessary to give any further description thereof.

The two jaws 14 and 16 are similar to each other, each being provided with clamping faces as at 20 and 22 and with a pair of drilled and counterbored openings as at 24 and 26 which are adapted to hold an allen head cap screw. The openings 24 and 26 are provided for the purpose of receiving these allen head cap screws for holding the jaws on the master jaws 27 which are movable within channels 28 cut into the face of the chuck 12 by means of gearing, not shown, within the chuck. The clamping faces 20 and 22, it should be noted, are off-set from the vertical planes of their respective jaws by an angle of approximately 15 degrees.

The third jaw 18 is different from the other two jaws and comprises a block 30 having a pair of flanges 32, one extending from each of two opposite faces thereof, and having side portions 34 thereon. The block 32 is also provided with a slide portion 36 upon which there is slidably positioned a jaw portion 38 having a flange 40 on each of two opposite faces thereof adjacent its inner edge. A pair of screws 42 extend through each flange 32 and each is adapted to abut against a flange 40 so as to exert pressure for slidably moving the portion 38 relative to the slide portion 36. The portion 38 is provided with slots 44 through which extend bolts 46 fixed in the slide portion 36. This slot and bolt arrangement provides guide means for holding the jaw portion on the block and also limits the extent of longitudinal movement of the jaw portion. Furthermore, the bolts act as locking means to hold the jaw portion in any position of adjustment relative to the block. The jaw 18 is also provided with partially threaded openings 48 to receive bolts for holding it to a master jaw 27 which is slidable in its channel 28. The clamping face 52 of the jaw 18 is also different from those of the other two jaws in that it is provided with a V-shaped groove, each wall of the groove being inclined at a 45 degree angle to the other wall thereof.

As shown in Fig. 1, when a workpiece of square cross-sectional configuration is to be worked upon, the three jaws 14, 16 and 18 are moved radially inward until the clamping faces of the jaws 14 and 16 abut against two sides of the workpiece and the V-shaped groove in the jaw 18 encompasses a corner of the workpiece but does not abut against it. The screws 42 are then manipulated to make a fine adjustment of the jaw portion 38 against the workpiece until the workpiece is held in firmly clamped centralized position. The bolts 46 are, thereafter, tightened to lock the jaw portion 38 in place.

When a workpiece of oblong cross-sectional configuration is to be worked upon, as illustrated in Fig. 2, either one of the jaws 14 and 16 is provided with an adapter block or shim 54 held by a bolt 56 against the clamping face and one side of the V-shaped groove on the jaw 18 is provided with a block or shim 58 held in place by a bolt 60. These shims take up the differential in area between the square and the oblong shaped workpiece.

Obviously many modifications and variations of the present invention are possible in the light of the above teachings. It is, therefore, to be understood that within the scope of the appended claim the invention may be practiced otherwise than as specifically described.

What is claimed as the invention is:

A workholding adapter for a standard chuck having a plurality of radially movable jaws comprising, a plurality of elongated jaws mounted on said chuck jaws for radial movement therewith, said elongated jaws having gripping faces thereon which are arranged at an acute angle to the longitudinal axis of said elongated jaws, an additional jaw mounted on another of said chuck jaws for radial movement therewith, said additional jaw having a gripping element thereon which is provided with a pair of angularly disposed faces, said faces capable of holding workpieces of any type cross-sectional configuration, means mounted on said additional jaw for fine adjustment of said jaw, said additional jaw comprising a block, a jaw portion slideable on said block, means for adjustably positioning said jaw portion relative to said block, and means for locking said jaw portion in adjusted position.

References Cited in the file of this patent

UNITED STATES PATENTS

| Number | Name | Date |
|---|---|---|
| 228,249 | Dimsey | June 1, 1880 |
| 601,513 | Hartness | Mar. 29, 1898 |
| 1,539,282 | Spurr | May 26, 1925 |
| 1,562,230 | Guttly | Nov. 17, 1925 |
| 2,140,303 | Swanson | Dec. 13, 1938 |
| 2,472,040 | Brookfield | May 31, 1949 |
| 2,657,068 | Sloan | Oct. 27, 1953 |
| 2,686,058 | Zetterberg | Aug. 10, 1954 |